(12) United States Patent
Nagase et al.

(10) Patent No.: US 8,419,191 B2
(45) Date of Patent: Apr. 16, 2013

(54) PROJECTION OPTICAL SYSTEM, PROJECTOR AND IMAGE READING DEVICE

(75) Inventors: Osamu Nagase, Iwate (JP); Yoshitsugu Kono, Iwate (JP)

(73) Assignee: Ricoh Optical Industries, Co., Ltd., Hanamaki-shi (JP)

( * ) Notice: Subject to any disclaimer, the term of this patent is extended or adjusted under 35 U.S.C. 154(b) by 536 days.

(21) Appl. No.: 12/529,920

(22) PCT Filed: Mar. 5, 2008

(86) PCT No.: PCT/JP2008/054431
§ 371 (c)(1),
(2), (4) Date: Sep. 4, 2009

(87) PCT Pub. No.: WO2008/111591
PCT Pub. Date: Sep. 18, 2008

(65) Prior Publication Data
US 2010/0097582 A1    Apr. 22, 2010

(30) Foreign Application Priority Data

Mar. 7, 2007 (JP) ................. 2007-057526
Jan. 23, 2008 (JP) ................. 2008-013116

(51) Int. Cl.
*G03B 21/22* (2006.01)
*G03B 21/28* (2006.01)
*G02B 17/00* (2006.01)

(52) U.S. Cl.
USPC ............................. 353/77; 359/727

(58) Field of Classification Search ........... 353/74, 353/77, 78, 79, 98, 99, 100, 101, 122; 348/744, 348/782, 783
See application file for complete search history.

(56) References Cited

U.S. PATENT DOCUMENTS

| | | | |
|---|---|---|---|
| 6,846,081 B2 * | 1/2005 | Mochizuki et al. | 353/70 |
| 2004/0046943 A1 * | 3/2004 | Muramatsu | 353/70 |
| 2007/0184368 A1 | 8/2007 | Nishikawa et al. | |

FOREIGN PATENT DOCUMENTS

| | | |
|---|---|---|
| JP | 2006-235516 | 9/2006 |
| JP | 2007-79524 | 3/2007 |
| JP | 2008 116688 | 5/2008 |
| JP | 2008-116688 | 5/2008 |
| WO | 2006 043666 | 4/2006 |
| WO | WO 2006/043666 A1 | 4/2006 |

* cited by examiner

*Primary Examiner* — William C Dowling
*Assistant Examiner* — Ryan Howard
(74) *Attorney, Agent, or Firm* — Oblon, Spivak, McClelland, Maier & Neustadt, L.L.P.

(57) ABSTRACT

An optical system with short total length to project a high quality large image. The system projects an image onto a projection surface, and includes a lens system having a plurality of lenses, and one or more curved mirrors. Light flux of an enlarged image shooting out from the lens system to the projection surface is incident onto a mirror surface of the one of the curved mirrors first of all. Distances OAL and Y satisfy a requirement 20 <OAL/Y <30. OAL is between the image surface and the surface of the curved mirror nearest the projection surface and along an optical path shared by the most lenses of the lens system, and on the image surface. Y is between the optical axis shared by the most lenses and an edge of the image surface which is farthest from the optical axis shared by the most lenses.

21 Claims, 17 Drawing Sheets

US 8,419,191 B2

PROJECTION OPTICAL SYSTEM, PROJECTOR AND IMAGE READING DEVICE

BACKGROUND OF THE INVENTION

1. Field of the Invention

The present invention relates to a projection optical system, a projector, and an image reading device.

2. Description of the Related Art

A projection optical system for projectors is used in order to enlarge an image on a transmission or reflection type liquid crystal panel, a digital mirror device or the like, and project the enlarged image onto projection surfaces. A variety of projection optical systems are well-known at present.

Such a projection optical system is required to assure long back-focus, excellent telecentric performance at an incident side of light flux for forming enlarged images, efficiently corrected chromatic aberration and distortion, high MTF characteristics, and high resolution.

Projectors are strongly required to display large projection images, and to be compact. As one of such compact projectors, a rear projector has been proposed in Japanese Patent Laid-open Publication No. 2006-235516. The rear projector includes a projection optical system in which a lens system and one concave mirror are used in combination.

SUMMARY OF THE INVENTION

Objects to be Accomplished by the Invention

The present invention is intended to realize a novel projection optical system which has a short total length and can project high quality and large images.

Further, the invention is intended to provide a projection optical system which has a short total length, can project a high quality and large image, and assures variable projection distances.

Still further, the invention is intended to provide a compact projector and an image reading device including the foregoing projection optical systems.

Means to Accomplish the Objects

1. A projection optical system according to the invention projects images on an image panel onto a projection screen.

The image displaying surface displays images to be enlarged and projected, and concretely is a panel surface of a transmissive or reflective type liquid crystal panel, a surface area on which mirrors of a digital mirror device are arranged, or the like, for instance.

The projection surface is a surface on which the enlarged image displayed on the image displaying surface is projected.

Concretely, the projection surface is a transmissive or reflective type screen or the like.

The projection optical system includes a lens system, and one or more curved mirrors.

The lens system includes a plurality of lenses and is positioned near the image displaying surface compared with the one or more curved mirrors.

The one or more curved mirrors have concave or convex mirror surfaces, and are positioned near the projection surface in an optical image forming path of light flux of enlarged images compared to the lens system. Specifically, the light flux of the enlarged image from the image displaying surface passes through the lens system, is reflected by the one or more curved mirrors, and is projected onto the projection surface.

The light flux of the enlarged images forms enlarged images.

The light flux of the enlarged image shooting out from the lens system to the projection surface is incident onto a concave surface of one of the curved mirrors first of all.

The number of curved mirrors is one or more, and one curved mirror is required at the minimum.

A distance OAL and a distance Y satisfy a requirement $$20 < OAL/Y < 30. \quad (1)$$

The distance OAL is present between the image displaying surface and the surface of the curved mirror nearest the projection surface, along an optical axis shared by the most lenses of the lens system.

On the image displaying surface, the distance Y is present between the optical axis shared by the most lenses and an edge of the image displaying surface which is farthest from the optical axis shared by the most lenses.

It is assumed that "n" lenses constitute the lens system. All of the "n" lenses may share one optical axis.

Alternatively, the lens system may have a plurality of lens groups. For example, one lens group include "n1" lenses which share one optical axis, while another lens group include "n2" lenses which share another optical axis, and so on.

In such a case, each lens group may include one lens. However, at least one lens group has to include a plurality of lenses.

The optical axis which is shared by the most lenses is the optical axis shared by the lenses which are included in the lens group with most lenses.

If there are a plurality of lens groups including the same number of most lenses, i.e. if there are two or more lens groups with the same optical axis and, in each of which lenses share the same optical axis, the distance Y is assumed to be largest.

The distance OAL is present between the image displaying surface and the surface of the curved mirror nearest the projection surface and along the straight line which is virtually extended on the optical axis of the lens group having the most lenses in both directions. When a non-refractive member (such as a color synthesis prism) is present on the virtual straight line between the image displaying surface and the lens system, a value which is obtained by dividing a physical thickness of the non-refractive member by a refractive index of the line e is applied to calculation of the distance OAL.

2. In the projection optical system in Item 1, sizes of the images projected onto the projection surface are variable. When changing an image size, a distance between the image displaying surface and the surface of the curved mirror farthest from the image displaying surface on the image forming path can be maintained constant. In this case, a part or all of optical elements which are present between the image displaying surface and the mirror surface of the curved mirror are relocated depending upon a distance between the surface of the curved mirror and the projection surface.

The optical elements refer to the lenses constituting the lens system, and one or more curved mirrors.

3. In the projection optical system in Item 1 or 2, the lenses constituting the lens system can share one optical axis. In other words, the lens system has the single optical axis, which is shared by the most lenses.

4. In the projection optical system in any one of Items 1 to 3, a numerical aperture at the image displaying surface side is preferably equal to or larger than 0.25.

5. In the projection optical system according to any one of Items 1 to 4, a negative lens which is nearest the image displaying surface out of negative lenses in the lens system is preferably in contact with the air, and has a concave surface facing with the image displaying surface.
6. In the projection optical system according to any one of Items 1 to 5, a stop is preferably provided between the lens nearest the image displaying surface and the lens nearest the projection surface.
7. In the projection optical system according to any one of Items 1 to 6, a refraction index nPe with respect to a line e of a lens material of a positive lens nearest the image displaying surface out of positive lens included in the lens system preferably satisfies a requirement $$1.45 < nPe < 1.65. \qquad (2)$$

8. In the projection optical system according to any one of Items 1 to 7, it is preferable that the curved mirror nearest the projection surface on the optical path has a surface which is axisymmetrical to the optical axis shared by the most lenses in the lens system.

In such a case, there are a plurality of optical axes each of which shared by the same number of most lenses. The foregoing optical axis is the axis which has the maximum distance Y.

9. In the projection optical system according to any one of Items 1 to 8, a stop is preferably provided between the lens nearest the image displaying surface and the lens nearest the projection surface.

Further, a refraction index nNe with respect to a line e of a lens material of each of negative spherical lenses (negative lenses with spherical surfaces) between the stop and curved mirror out of negative lens included in the lens system preferably satisfies a requirement $$2.0 > nNe > 1.65. \qquad (3)$$

10. The projection optical system according to any one of Items 1 to 9 may include one curved mirror.

The projection optical system in any one of Items 1 to 10 may have one or more flat mirrors in the optical path for bending an image forming path depending upon practical use.

11. A projector according to the present invention has a projection optical system referred to in any one of Items 1 to 10.
12. An image reading device according to the invention is a device to read the image, using the projection optical system in any one Items 1 to 10 as a reducing optical system, and using image pickup elements. The light receiving surface of the image pickup elements is situated at the optically equivalent position of the image displaying surface.

It is possible to constitute an image recorder by using a recording unit for recording images read by the image reading device.

A position at which a light receiving surface of image pickup elements is provided may be the position of the image displaying surface or may be a position which is optically equivalent to the image displaying surface, i.e. an optically equivalent position of an image of the reducing optical system.

Therefore, the image recorder can include the image displaying surface and image pickup elements.

The present invention is intended to realize the projection optical system which has a short total length but can project a large image.

Generally, when a projection optical system includes only ordinary lenses, a whole length of the lenses is approximately determined by an f-stop number and a half field angle.

The projection optical system of the invention includes the lens system and the curved mirror in combination. Fundamental features of this projection optical system are in common with a projection optical system including only ordinary lenses. The larger the image displaying area of the image displaying surface, i.e. the larger the distance Y, the more difficult to maintain the optical performance. To overcome this problem, a whole length of the optical system (approximately equal to the distance OAL) should be increased.

The requirement (1) is defined to balance the optical performance of the projection optical system and the whole length.

It is assumed that the parameter OAL/Y is smaller than the lower limit. Even if the whole length is any large value, an image surface inevitably becomes rough, which means that the projection optical system cannot assure sufficient optical performance.

If the parameter OAL/Y exceeds the upper limit of the requirement (1), the optical system will be lengthened. The projection optical system may not be applicable to actual use if the optical path is not folded by a flat mirror or the like as in an optical system for a rear projection television system.

The projection optical system of the invention is applicable to both a rear projector and a front projector. When applied to the front projector, the projection optical system can change an image size by changing a distance between the projection optical system and the projection surface as in the projection optical system referred to in Item 2.

In the foregoing case, besides what is called "focusing", the projection optical system can correct variations of an inclination of an image surface and a distortion of a contour of the image surface, which are caused by variations of image sizes, by mainly moving a part or all of the lenses in accordance with variations of the projection distance. A part or all of the lenses may be moved depending upon the lens configuration.

The same effect may be accomplished by moving the image displaying surface or the curved mirror, which is furthest from the image displaying surface, with respect to the image displaying surface. However, moving the image displaying surface has to be carried out with extremely refined precision since it should be performed near a reducing conjugation point. Further, sometimes a lighting fixture like a lamp has to be moved.

The curved mirror which is nearest the projection surface on the optical path is inevitably large. A large component should be used in order to move the large curved mirror, which will enlarge the whole system and increase a cost. Under the foregoing circumstance, it is preferable to correct the inclination of the image surface and distortion of the image contour, which are caused in response to variations of the projection distance, by moving a part or all of the lenses in the lens system.

A part of lenses of the lens system may be exaxial with respect to other lenses, which will increase freedom of arrangement of components, and improve design performance. However, it is further difficult to precisely decentralize some lenses compared to make the lenses coaxial.

According to the invention, the lenses in the lens system of the projection optical system can share one optical axis. In such a case, the lenses are not exaxial, so that the projection optical system can maintain its reliable performance. Further, when the requirement (1) is satisfied, the projection optical system can assure the reliable performance even if lenses are exaxial.

Further, when applied to the front projector, the projection optical system of the invention is required to be a well-lit optical system so that the projection images can be recognized in a bright environment. The projection optical system referred to in Item 4 has a numerical aperture of 0.25 or larger at the image displaying surface side, so that the projection optical system functions as the well-lit optical system.

If the curved mirror which is nearest the projection surface in the optical path and extensively contributes to the image quality is axiasymmetrical, the optical character of the mirror surface is scarcely affected by directions.

This feature is advantageous in that an aspect ratio of the displayed image can be easily maintained. However, in order to assure a certain degree of resolution and distortion, it may be effective to use axiasymmetrical mirror surfaces, i.e. so-called freely curved mirror surfaces.

In the projection optical system of the invention, the lens system is constituted by rotationally symmetrical lenses as essential and practical components. Practically, the lenses should have strong positive power as a whole. However, when oblique light fluxes are used for forming the enlarged images, the lens system tends to recline enlarged images backward to the projection screen. The reclined images can be pulled forward on to the projection screen by means of a concave mirror. Images which can be corrected by the foregoing measures are mainly meridional images while sagittal image cannot be sufficiently corrected.

In the projection optical system referred to in Item 5, the negative lens which is nearest the image displaying surface has its concave surface facing with the image displaying surface and being in contact with air which has a large refractive index difference from a lens material. This structure is effective in correcting the sagittal image without extensively affecting the meridional images.

In the projection optical system referred to in Item 6, the stop is provided between the lens nearest the image displaying surface and the lens nearest the projection surface. This enables various aberrations to be corrected in a well balanced manner.

The requirement (2) referred to in Item 7 defines the condition for assuring the inclination and uniformity of images. If the requirement (2) exceeds the upper limit, the image surface may be inclined short of the projection screen while if the requirement (2) does not meet the lower limit, the image surface may be reclined to a backward of the projection screen.

The requirement (3) in Item 9 for the projection optical system is defined to assure the uniformity of the images. In order to reduce a Petzval sum, a projection optical system using ordinary lenses only, preferably includes negative lenses made of a material whose refractive index is small.

With the projection optical system of the invention, the negative lenses have a large refractive index in view of a balance of the curved field of the image caused by the curved mirror and by the lenses. In short, the use of negative lenses with a large refractive index is effective in improving the performance of the projection optical system.

If the requirement (3) is below the lowest limit, image surface will be backward of the projection screen. On the other hand, if the requirement (3) is above the upper limit, image surface will be forward of the projection screen. It is not easy to correct such a gap of image surface by other countermeasures.

A plurality of curved mirrors may be usable so long as they do not interfere with the optical path. The curved mirrors can disperse or negate aberrations, and contribute to producing high quality and good images.

In accordance with the invention, the projection optical system essentially performs the front projection in which reflected light beams are observed on the reflective projection screen. The projection optical system is also applicable to the rear projection in which images are projected via the rear side of the transmissive projection screen.

Further, the projection optical system of the invention is usable as an image reader in which light receiving elements such as CCDs or MOSs are present at the image displaying surface or at a position optically equivalent to the image displaying surface. In this case, the projection optical system functions as a reduction optical system, and reads images on the projection screen.

EFFECTS OF THE INVENTION

The present invention can realize the projection optical system which has a short total length but can project the large image with high resolution, small distortion, and can assure a variable projection distance.

Further, the invention can provide the projector and the image reading device including the foregoing optical projecting system.

| DESCRIPTION OF REFERENCE SYMBOLS | |
|---|---|
| IP: | image displaying surface |
| P: | prism |
| L: | lens system |
| S: | stop |
| MS: | mirror surface |
| PS: | projection surface |

BEST MODE FOR CARRYING OUT THE INVENTION

Hereinafter, the invention will be described with reference to specific embodiments.

Figure 1:
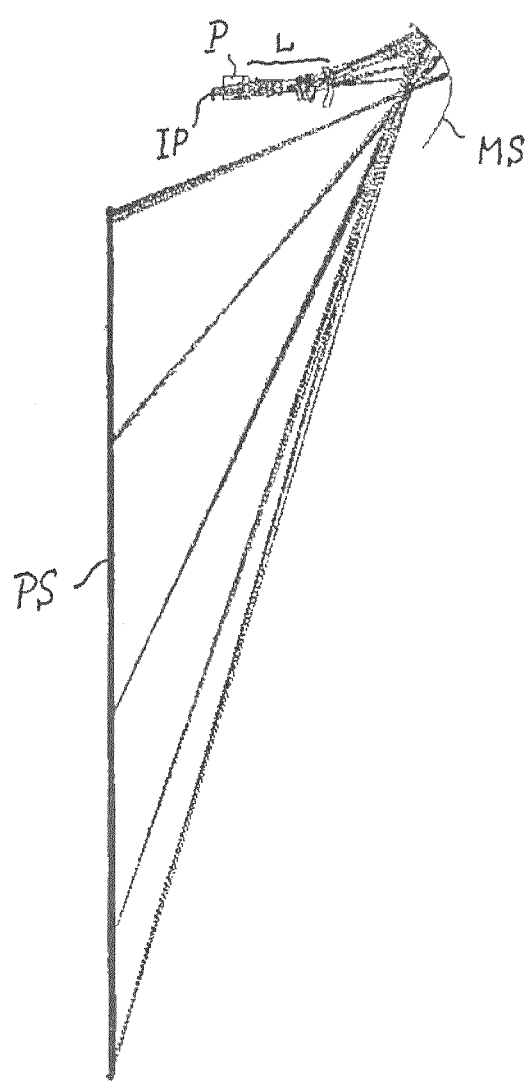
FIG. 1 shows a projector according to an embodiment of the invention.

FIG. 1 shows a configuration of a projector according to an embodiment of the invention.

In FIG. 1, IP denotes an image displaying surface, P denotes a prism, L denotes a lens system, MS denotes a reflecting surface of a curved mirror, and PS denotes a projection screen as a projection surface.

The image displaying surface IP is practically a panel surface of a transmitting or reflecting type liquid crystal panel, a surface area on which mirrors of a digital mirror device are arranged, or the like, for instance. The prism P is a color synthesis prism or the like. The lens system L includes a plurality of lenses. On an image-forming optical path, the reflecting surface MS is positioned near the projection screen PS as a projection surface, compared to the lens system L, and is curved inwards toward the lens system L. In this embodiment, all of the lenses of the lens system L share one optical axis.

Referring to FIG. 1, the image displaying surface IP is displaced downward with respect to the optical axis shared by the lenses of the lens system L. Therefore, there is a distance Y between the optical axis of the lens system L and a lower edge of the image displaying surface IP as shown at a lower part in FIG. 1.

Since the image panel IP is displaced with respect to the optical axis of the lens system L, a projection optical system forms an image using oblique rays, and functions as a so-called off-axis optical system. The image displayed on the image displaying surface IP is enlarged by image forming functions of the lens system L and the reflecting surface MS of the curved mirror, and is formed and projected onto the projection screen PS as shown in FIG. 1.

Figure 2:
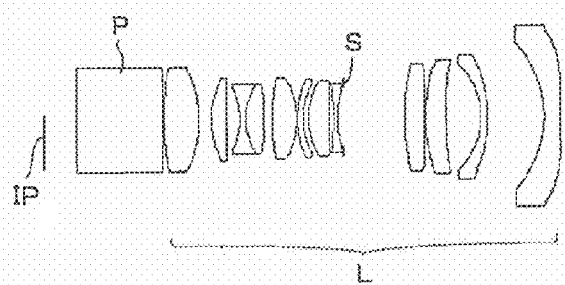
FIG. 2 shows a first example (Example 1) of a projection optical system in the embodiment shown in FIG. 1.
Figure 2:
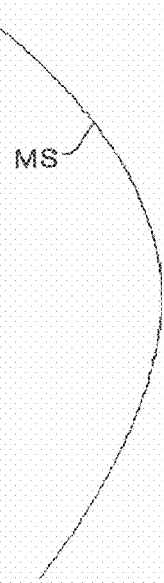

FIG. 2 shows a practical example of the projection optical system according to the embodiment shown in FIG. 1. In FIG. 2, "S" denotes a stop provided in the lens system L.

Data of the projection optical system shown in FIG. 2 are referred to hereinafter as Example 1. Like or corresponding symbols are also used throughout Example 2 to Example 4.

i: an i-th surface (a prism surface, a lens surface, a stop surface or a reflecting surface) counted from the image panel.

IMG: screen surface

Ri: a radius of curvature of the (i)-th surface counted from the image displaying surface Di: a distance between the (i)-th surface and (i+1)-th surface counted from the image displaying surface Do: a distance between the image displaying surface and the first surface J: a lens number counted from the image panel Nj: a refractive index of a (j)-th lens, counted from the image displaying surface, with respect to a d-line νj: Abbe number of a (j)-th lens counted from the image displaying surface (*)-marked surfaces are rotation-symmetric-aspheric surfaces.

(#)-marked surfaces are free-form curved surfaces.

Unless particularly specified, an eccentricity of the lenses and mirror is 0.

Shapes of the rotation-symmetric-aspheric surfaces are expressed by a well-known formula, where z denotes a coordinate in a direction of the optical axis; h denotes a coordinate in a direction orthogonal to the optical axis; Ri denotes an axialis radius of curvature: K denotes a conical constant; and A, B, C, D, E, F, and G denote coefficients.

$$z=(1/Ri)\cdot h^2/[1+\sqrt{\{1-(K+1)\cdot(1/Ri)^2\cdot h^2\}}]+A\cdot h^4+B\cdot h^6+C\cdot h^8+D\cdot h^{10}+E\cdot h^{12}+F\cdot h^{14}+G\cdot h^{16}$$

Shapes of the free-form curved surfaces are expressed by the following formula, where x denotes a horizontal coordinate of the projection screen; y denotes a vertical coordinate of the projection screen; z denotes a coordinate of a direction which is orthogonal to the horizontal and vertical directions x and y; Ri denotes an axialis curvature of radius; K denotes an ellipse constant; and Cj denotes coefficients (j=2~66). In this case, j is assumed to be $[(m+n)^2+m+3n]/2+1$.

$$z=(1/Ri)\cdot h^2/[1+\sqrt{\{1-(K+1)\cdot(1/Ri)^2\cdot h^2\}}]+\Sigma Cj\cdot x^m y^n$$

A computation reference wavelength is 550 nm (green).

EXAMPLE 1

| i | R | D | j | N | ν |
|---|---|---|---|---|---|
| 0 | ∞ | 10.400 | | | |
| 1 | ∞ | 27.500 | | 1.51680 | 64.2 |
| 2 | ∞ | Variable | | | |
| 3 | 90.67541 | 11.466 | 1 | 1.61800 | 63.4 |
| 4 | −36.32076 | 4.051 | | | |
| 5 | 29.82045 | 4.500 | 2 | 1.48749 | 70.4 |
| 6 | 989.57270 | 4.312 | | | |
| 7 | −24.04669 | 1.800 | 3 | 1.75520 | 27.5 |
| 8 | 19.38336 | 5.800 | 4 | 1.49700 | 81.6 |
| 9 | −121.56068 | 2.680 | | | |
| 10 | 62.28636 | 7.972 | 5 | 1.59270 | 35.5 |
| 11 | −24.68738 | 0.300 | | | |
| 12 | 32.12683 | 1.500 | 6 | 1.80610 | 40.7 |
| 13 | 21.27498 | 1.834 | | | |
| 14 | 21.72845 | 6.909 | 7 | 1.59270 | 35.5 |
| 15 | 962.64456 | 1.172 | | | |
| 16 | −98.83816 | 1.500 | 8 | 1.77250 | 49.6 |
| 17 | 39.40166 | 2.076 | | | |
| 18 (Stop) | ∞ | 19.418 | | | |
| 19 | 83.27478 | 6.299 | 9 | 1.58144 | 40.9 |
| 20 | −343.22066 | Variable | | | |
| 21 | 52.99491 | 6.439 | 10 | 1.80610 | 33.3 |
| 22 | 107.31174 | 11.198 | | | |
| 23 | −23.64924 | 2.275 | 11 | 1.69895 | 30.1 |
| 24 | −44.35174 | Variable | | | |
| 25 (*) | −31.88842 | 5.500 | 12 | 1.53046 | 55.8 |
| 26 (*) | 0.374805E−7 | Variable | | | |
| 27 (#) | −75.12400 | Variable | | (Mirror surface) | |
| IMG | ∞ | 0.0 | | | |

In Example 1 and the following examples, D is in units of millimeter. In Example 1, a 25th surface is rotation-symmetrical and aspheric. Coefficients are as follows.

K=−0.647409

A=−0.216474E−06, B=−0.125574E−08, C=−0.145745E−13,

D=0.0, E=0, F=0, G=0

A 26th surface is rotation-symmetrical and aspheric. Coefficients are as follows.

K=−0.336961E+22

A=−0.102806E−04, B=0.272899E−08, C=−0.197767E−11,

D=0.0, E=0, F=0, G=0.

A 27th surfaces is a free-from curved surface. Coefficients are as follows.

K=−1.0

C7=−1.0688E−05, C8=−1.2005E−05, C9=−4.4146E−06, C10=−1.2968E−05 C11=7.7094E−08, C12=2.0953E−07, C13=2.3356E−07, C14=7.2321E−08 C15=

1.5468E−07, C16=1.0049E−09, C17=−3.7655E−10, C18=−6.1907E−10 C19=−3.1177E−10, C20=6.3132E−12, C21=2.6661E−10, C22=−1.1863E−11 C23=−8.1479E−12, C24=−2.0740E−11, C25=−4.6813E−12, C26=−2.2214E−11 C27=−3.1925E−12, C28=−1.0867E−11

C2~C6 and C29~C66 are 0.

In the foregoing, [E−05] represents [×10$^{-5}$], for instance. This holds true to the following Examples.

Variable values:

| | Size of Projection Screen | |
|---|---|---|
| | 78 inches | 64 inches |
| D2 | 0.200 | 0.332 |
| D20 | 1.255 | 0.300 |
| D24 | 17.706 | 17.874 |
| D26 | 173.957 | 174.612 |
| D28 (projection distance) | −494.000 | −416.070 |

NA of the image displaying surface side=0.25
OAL=329.62 Y=12.5
Parameter for Condition (1): 26.7
Parameter for Condition (2): 1.620
Parameter for Condition (3): 1.704 (Ne of 11th lens)

Figure 3:
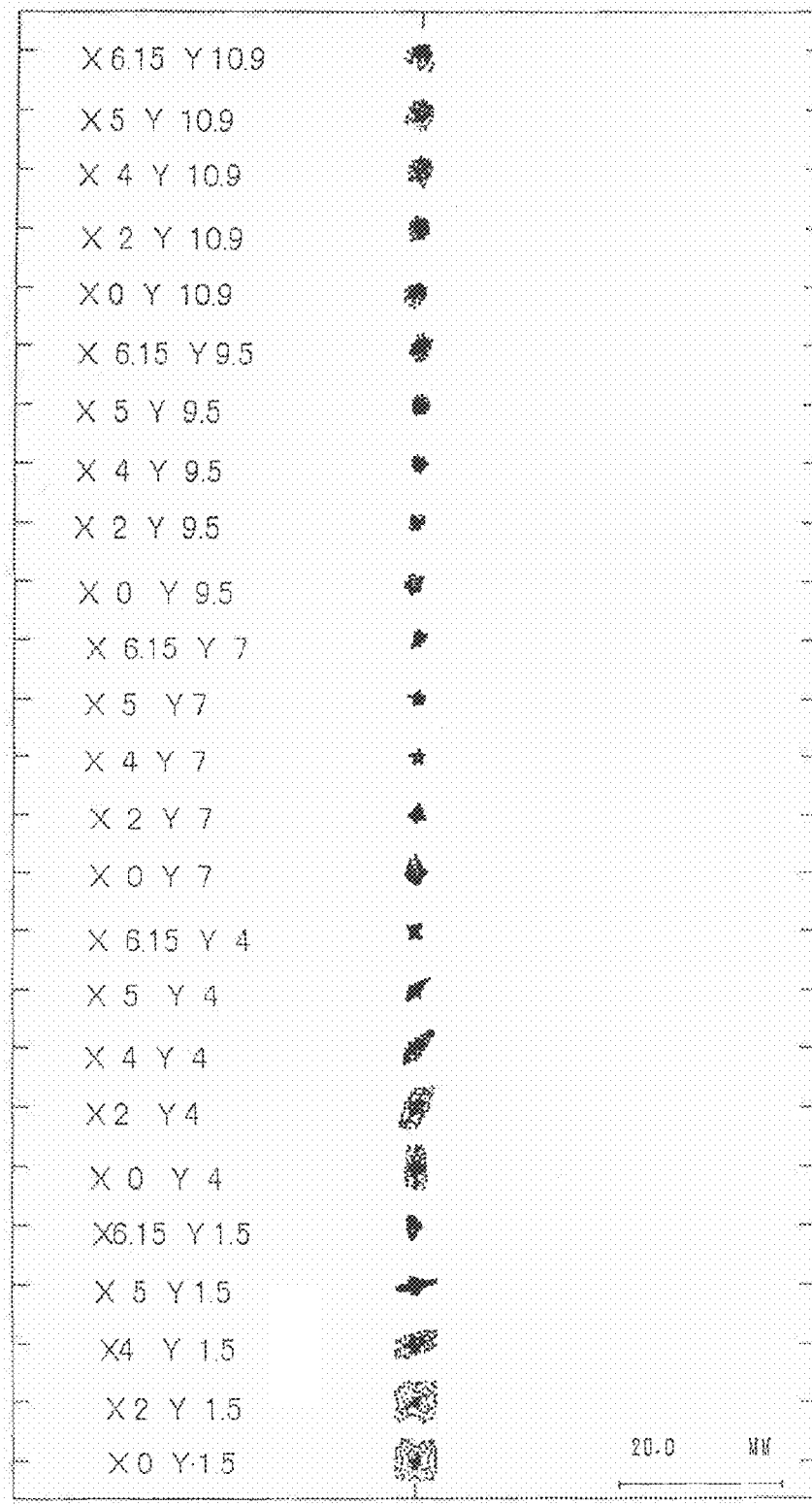
FIG. 3 is a spot diagram of an image projected on a 78-inch projection screen in Example 1.

FIG. 3 is a spot diagram of images displayed on the projection screen PS in Example 1.

In the spot diagram of FIG. 3, the images, which are on a liquid crystal image panel having an aspect ratio of 4:3 and a diagonal length of 0.6 inches, are enlarged and projected onto the projection screen having a diagonal length of 78 inches.

Figure 4:
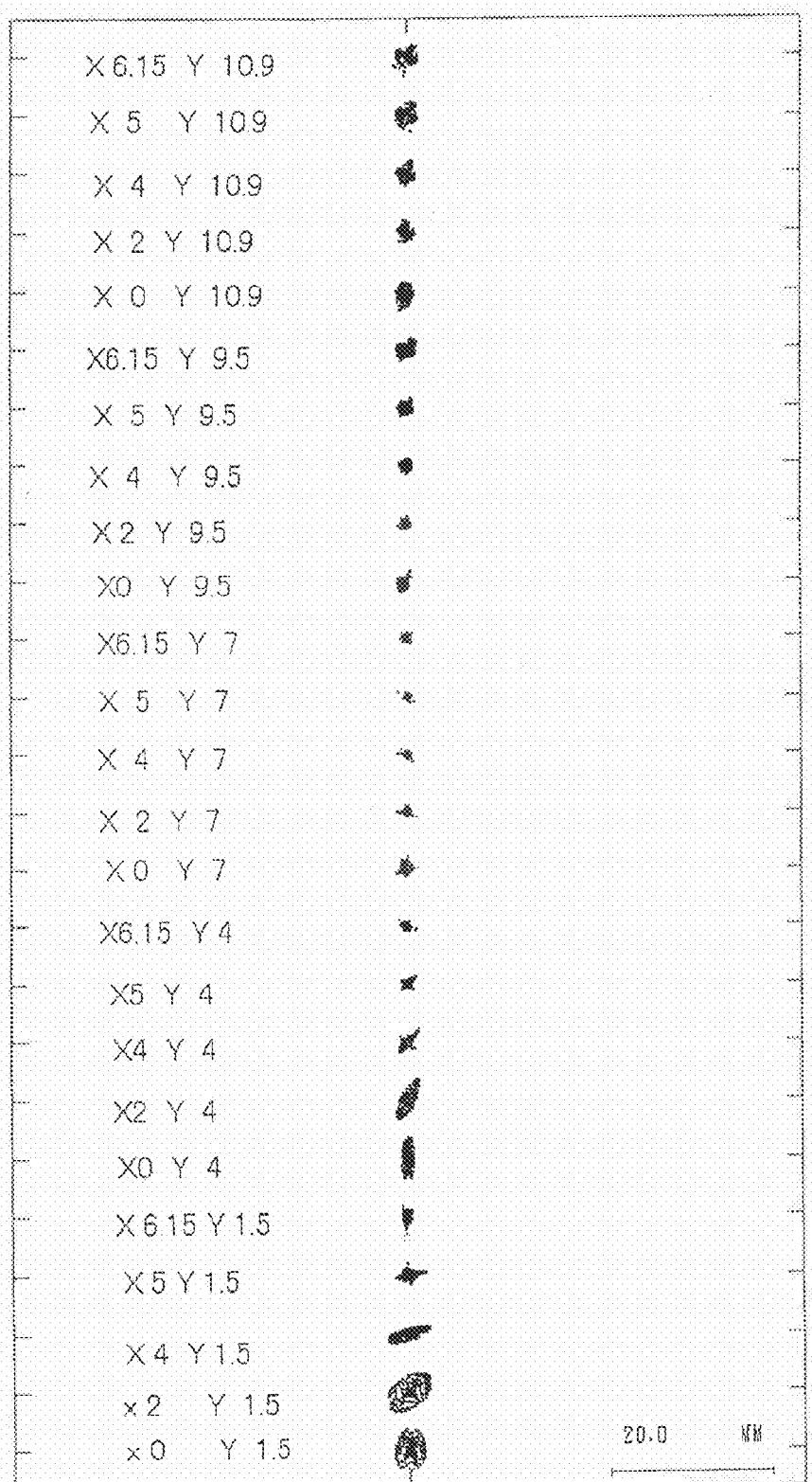
FIG. 4 is a spot diagram of an image projected on a 64-inch projection screen in Example 1.

FIG. 4 is a further spot diagram of images displayed on the projection screen PS in Example 1.

In the spot diagram of FIG. 4, images, which are on a liquid crystal image panel having the aspect ratio of 4:3 and the diagonal length of 0.6 inches, are enlarged and projected onto a projection screen having a diagonal length of 64 inches.

In FIG. 3, numeric values on the left side denote the x and y coordinates on the image panel. For instance, x 6.15 and y 10.9 respectively denote that x is 6.15 mm, and that y is 10.9 mm. The same holds true to the numeric values shown in FIGS. 4, 7, 8, 11, 12, 15, 16 and 17 for Examples 2 to 4 to be described later.

Figure 5:
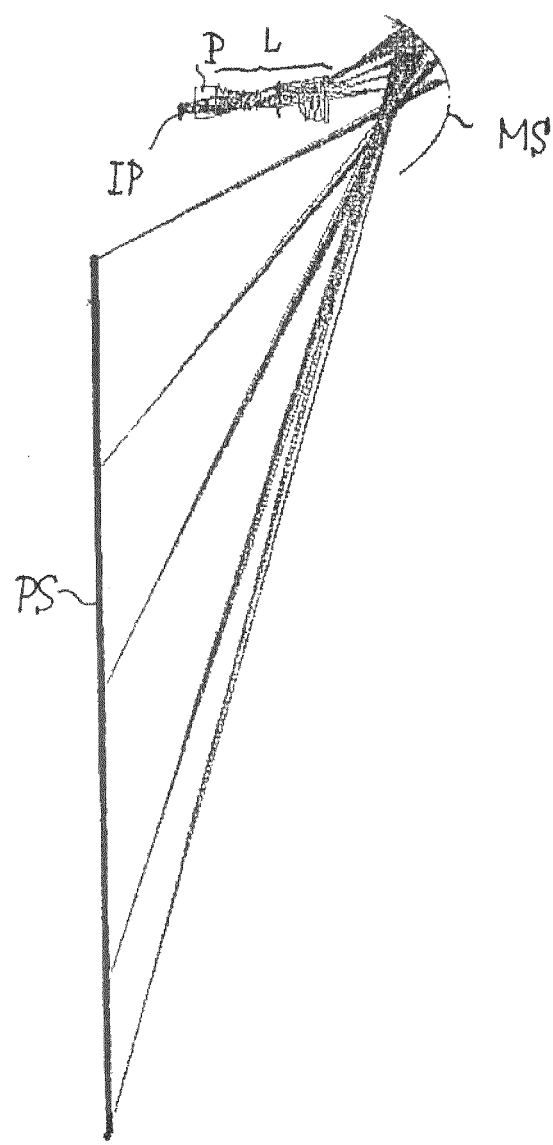
FIG. 5 shows a projector according to a further embodiment of the invention.

A projector in a further embodiment of the invention is shown in FIG. 5. For convenience sake, like or corresponding reference symbols and reference numbers are used as those shown in FIG. 1.

In the embodiment of FIG. 5, the lenses in the lens system L share one optical axis as in the embodiment shown in FIG. 1.

Referring to FIG. 5, the image displaying surface IP is displaced downward with respect to the optical axis shared by the lenses in the lens system L. Therefore, in FIG. 5, there is a distance Y between the optical axis of the lens system L and a lower edge of the image displaying surface IP, shown at a lower part in FIG. 5.

Since the image displaying surface IP is displaced with respect to the optical axis of the lens system L, the projection optical system is an off-axis optical system which forms images using oblique rays. The images displayed on the image displaying surface IP are enlarged and projected onto the projection screen PS by image forming functions of the lens system L and the reflecting surface MS of the curved mirror as shown in FIG. 5.

Figure 6:
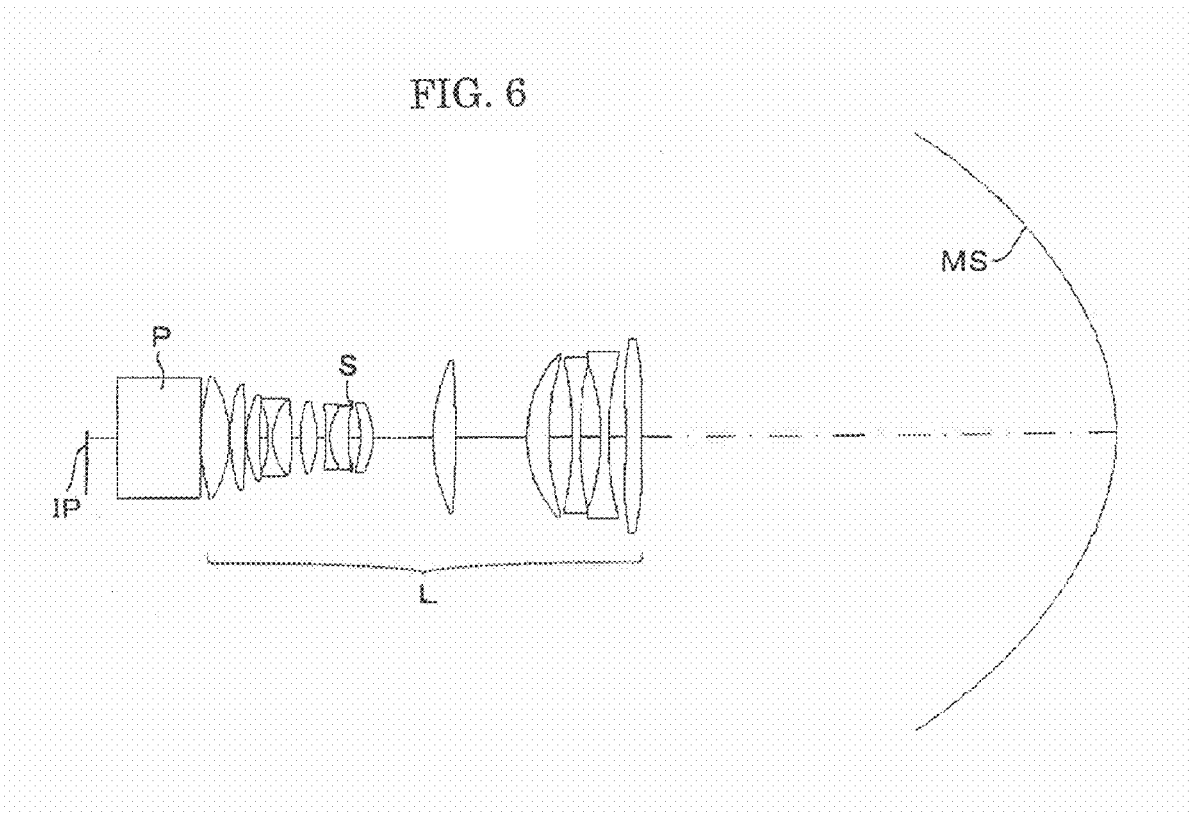
FIG. 6 shows a second example (Example 2) of a projection optical system in the embodiment in FIG. 5.

FIG. 6 shows a practical example of the projection optical system in the embodiment shown in FIG. 5.

Specific data of the projection optical system in the practical example (Example 2) are as follows.

EXAMPLE 2

| i | R | D | j | N | ν |
|---|---|---|---|---|---|
| 0 | ∞ | 10.800 | | | |
| 1 | ∞ | 29.200 | | 1.51680 | 64.1 |
| 2 | ∞ | 0.000 | | | |
| 3 | 73.73405 | 10.106 | 1 | 1.49700 | 81.6 |
| 4 | −40.82989 | 0.300 | | | |
| 5 | 57.50288 | 5.302 | 2 | 1.48749 | 70.4 |
| 6 | −201.92517 | 0.300 | | | |
| 7 | 32.43349 | 4.622 | 3 | 1.48749 | 70.4 |
| 8 | 156.25824 | 3.042 | | | |
| 9 | −35.40145 | 1.600 | 4 | 1.83400 | 37.3 |
| 10 | 20.11036 | 6.753 | 5 | 1.49700 | 81.6 |
| 11 | −97.87929 | 2.936 | | | |
| 12 | 36.31999 | 6.057 | 6 | 1.53172 | 48.8 |
| 13 | −32.20945 | 3.166 | | | |
| 14 | −112.21202 | 1.400 | 7 | 1.83400 | 37.3 |
| 15 | 19.22969 | 6.712 | 8 | 1.63980 | 34.6 |
| 16 | 50.95246 | 2.741 | | | |
| 17 (Stop) | ∞ | 1.589 | | | |
| 18 | −41.10637 | 4.320 | 9 | 1.54814 | 45.8 |
| 19 | −27.04608 | 21.116 | | | |
| 20 | 64.31575 | 7.884 | 10 | 1.74400 | 44.9 |
| 21 | −381.36942 | Variable | | | |
| 22 | 42.73212 | 7.730 | 11 | 1.80610 | 40.7 |
| 23 | 92.52370 | Variable | | | |
| 24 | −112.67420 | 2.500 | 12 | 1.83400 | 37.3 |
| 25 | 107.92882 | 7.692 | | | |
| 26 | −74.07870 | 2.500 | 13 | 1.83400 | 37.3 |
| 27 | 106.89642 | Variable | | | |
| 28 (*) | −180.06105 | 5.500 | 14 | 1.53046 | 55.8 |
| 29 (*) | 516.13189 | Variable | | | |
| 30 (*) | −77.32762 | Variable | (Mirror surface) | | |
| IMG | ∞ | 0.000 | | | |

A 28th surface is rotation-symmetric and aspheric, and has the following coefficients.
K=14.722645
A=0.419885E−05, B=0.297558E−08, C=−0.637756E−11,
D=0.465514E−14, E=−0.123269E−17, F=0, G=0

A 29th surface is rotation-symmetric and aspheric, and has the following coefficients.
K=−200.000
A=−0.397967E−05, B=0.401039E−08, C=−0.454979E−11,
D=0.251307E−14, E=−0.425185E−18, F=0, G=0

A 30th surface is rotation-symmetric and aspheric, and has the following coefficients.
K=−2.360048
A=−0.274563E−06, B=0.161310E−10, C=−0.114777E−14,
D=0.291873E−19, E=0.140965E−23, F=−0.184116E−27, G=0.546153E−32

Variables

| | Sizes of Projection Screens | |
|---|---|---|
| | 78 inches | 64 inches |
| D21 | 24.494 | 22.999 |
| D23 | 8.310 | 8.760 |

| | Sizes of Projection Screens | |
|---|---|---|
| | 78 inches | 64 inches |
| D27 | 6.326 | 6.107 |
| D29 | 170.000 | 171.264 |
| D30(Projection Distance) | −493.000 | −415.670 |

NA of the displaying surface side=0.27
OAL=355.27 Y=16.2
Parameter for Condition (1): 21.9
Parameter for Condition (2): 1.498
Parameter for Condition (3): 1.839 (Ne of 12th lens), and 1.839 (Ne of the 13th lens)

Figure 7:
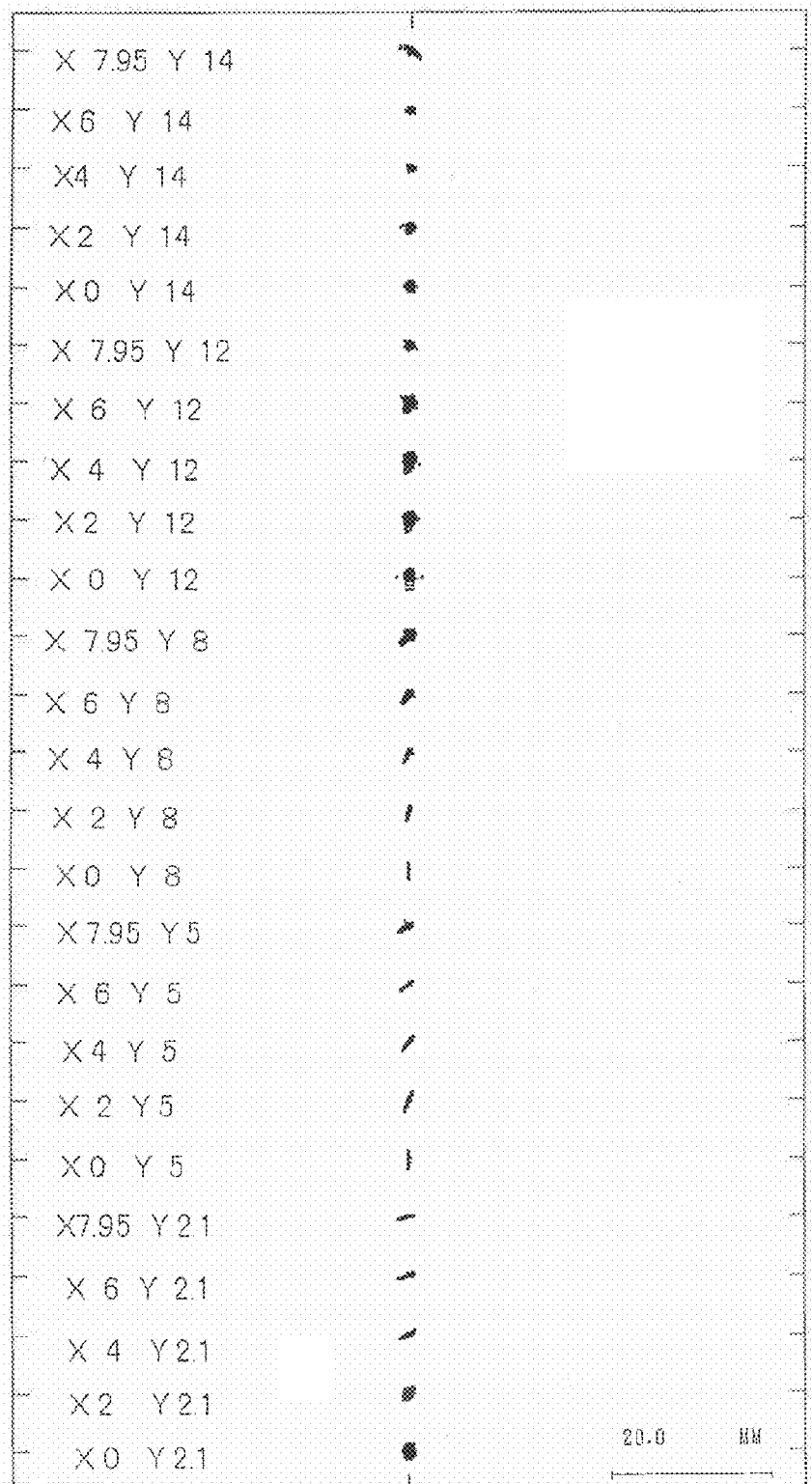
FIG. 7 is a spot diagram of an image projected on the 78-inch projection screen in Example 2.

FIG. 7 is a spot diagram of images displayed on the projection screen PS in Example 2.

In the spot diagram of FIG. 7, images, on a liquid crystal panel whose aspect ratio is 4:3 and whose diagonal length is 0.78 inches, are enlarged and projected onto a screen having the diagonal length of 78 inches.

Figure 8:
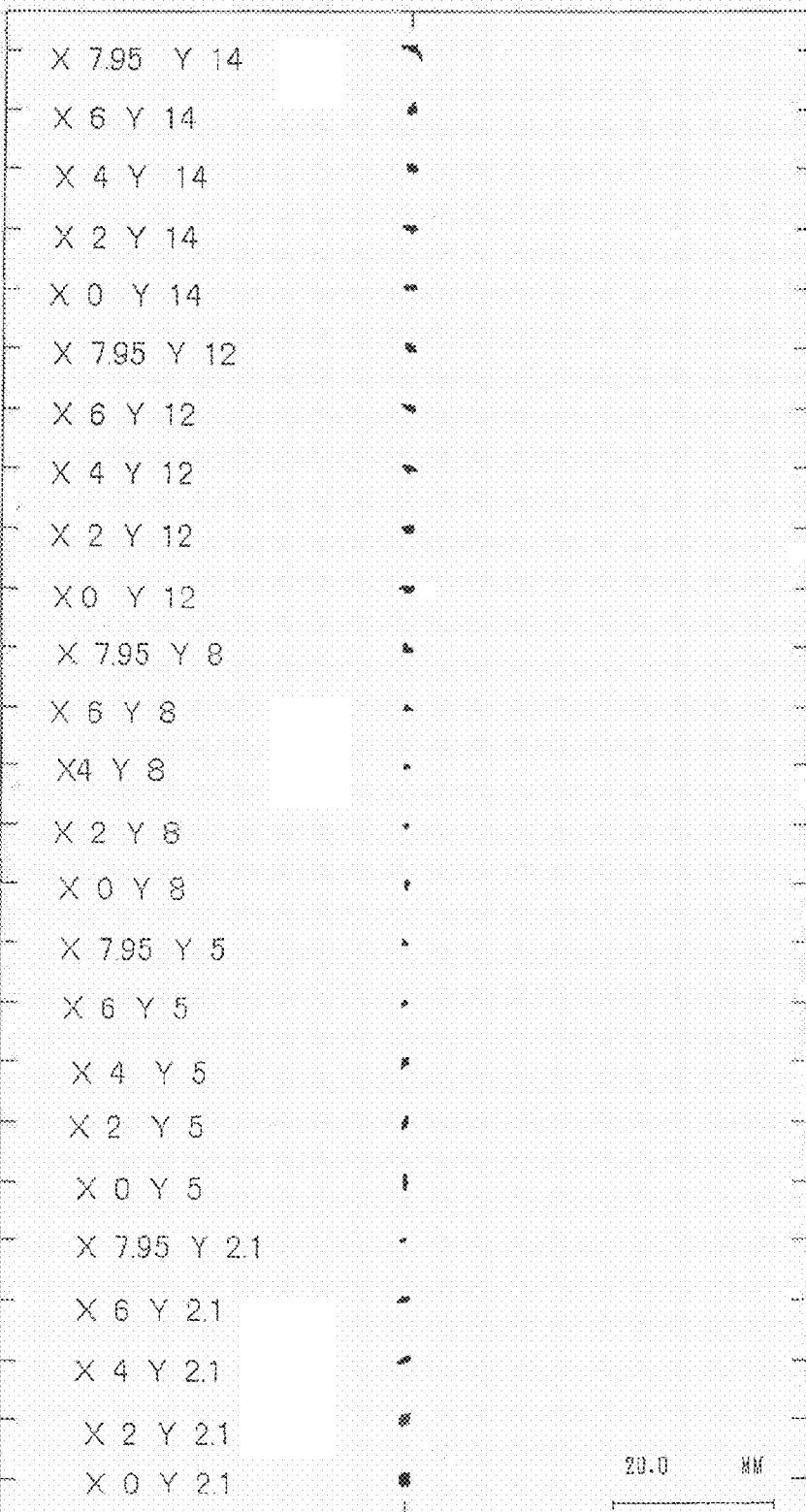
FIG. 8 is a spot diagram of an image projected on the 64-inch projection screen in Example 2.

FIG. 8 is a spot diagram of images displayed on the projection screen PS in Example 2.

In the spot diagram of FIG. 8, images, on a liquid crystal image panel whose aspect ratio is 4:3 and whose diagonal length is 0.78 inches, are enlarged and projected onto a projection screen having the diagonal length of 64 inches.

The optical projection systems in Examples 1 and 2 shown in the spot diagrams of FIG. 3, FIG. 4, FIG. 7 and FIG. 8 exhibit excellent performance.

Figure 9:
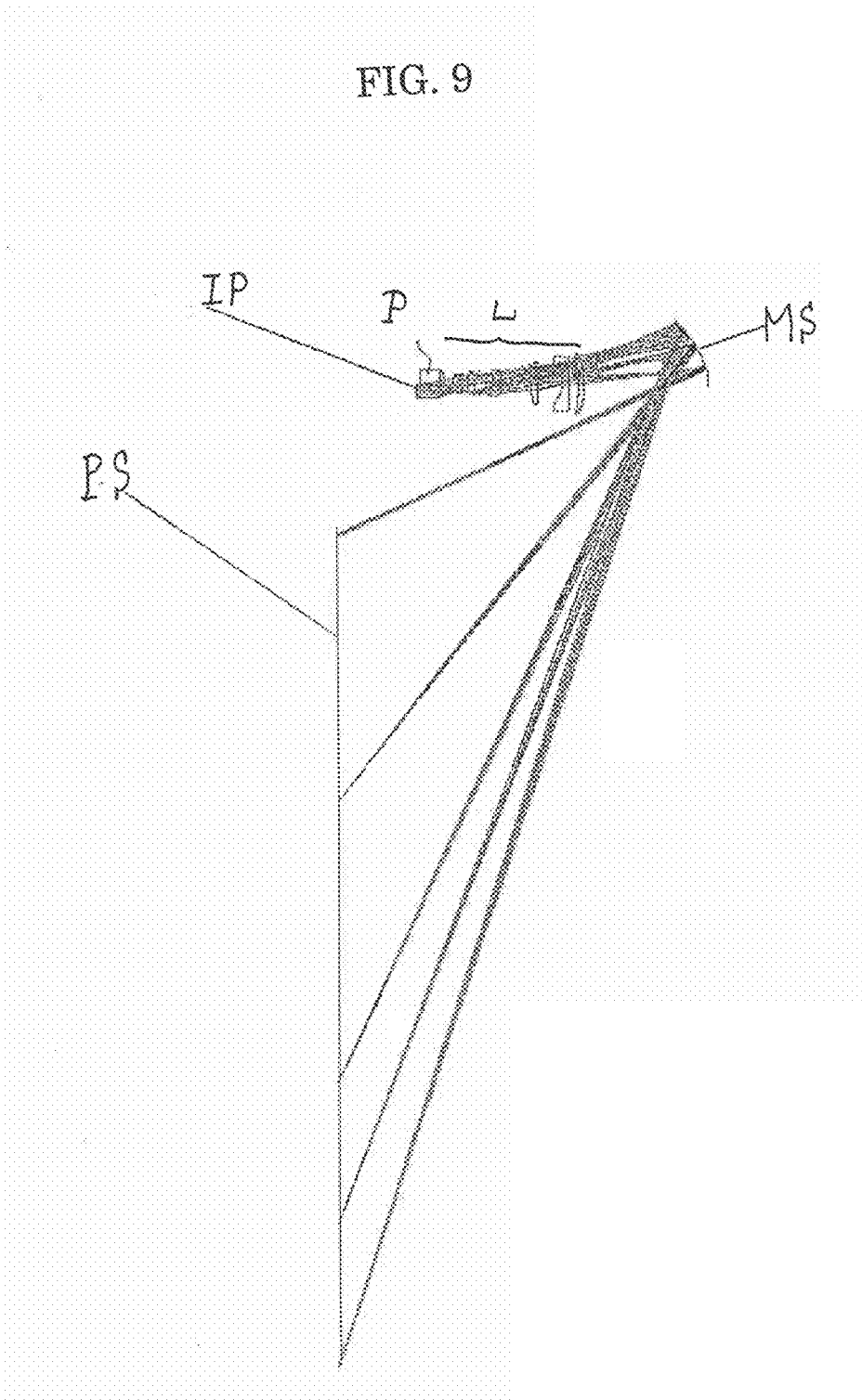
FIG. 9 shows a projector according to a still further embodiment of the invention.

FIG. 9 shows an example according to a further embodiment of the projector. For the convenience sake, like or corresponding symbols are also used in this example.

In the embodiment shown in FIG. 9, the lenses of the lens system L share one optical axis.

Referring to FIG. 9, the image displaying surface IP is displaced downward with respect to the lenses sharing the same optical axis. In FIG. 9, "Y" denotes a distance between the optical axis of the lens system L and the lower edge of the image displaying surface IP.

Since the image displaying surface IP is displaced with respect to the optical axis of the lens system L, the projection optical system is an off-axis optical system which forms images using oblique light rays. The images on the image displaying surface IP are enlarged and projected onto the projection screen PS by the image forming functions of the lens system L and the reflecting surface of the curved mirror MS.

Figure 10:
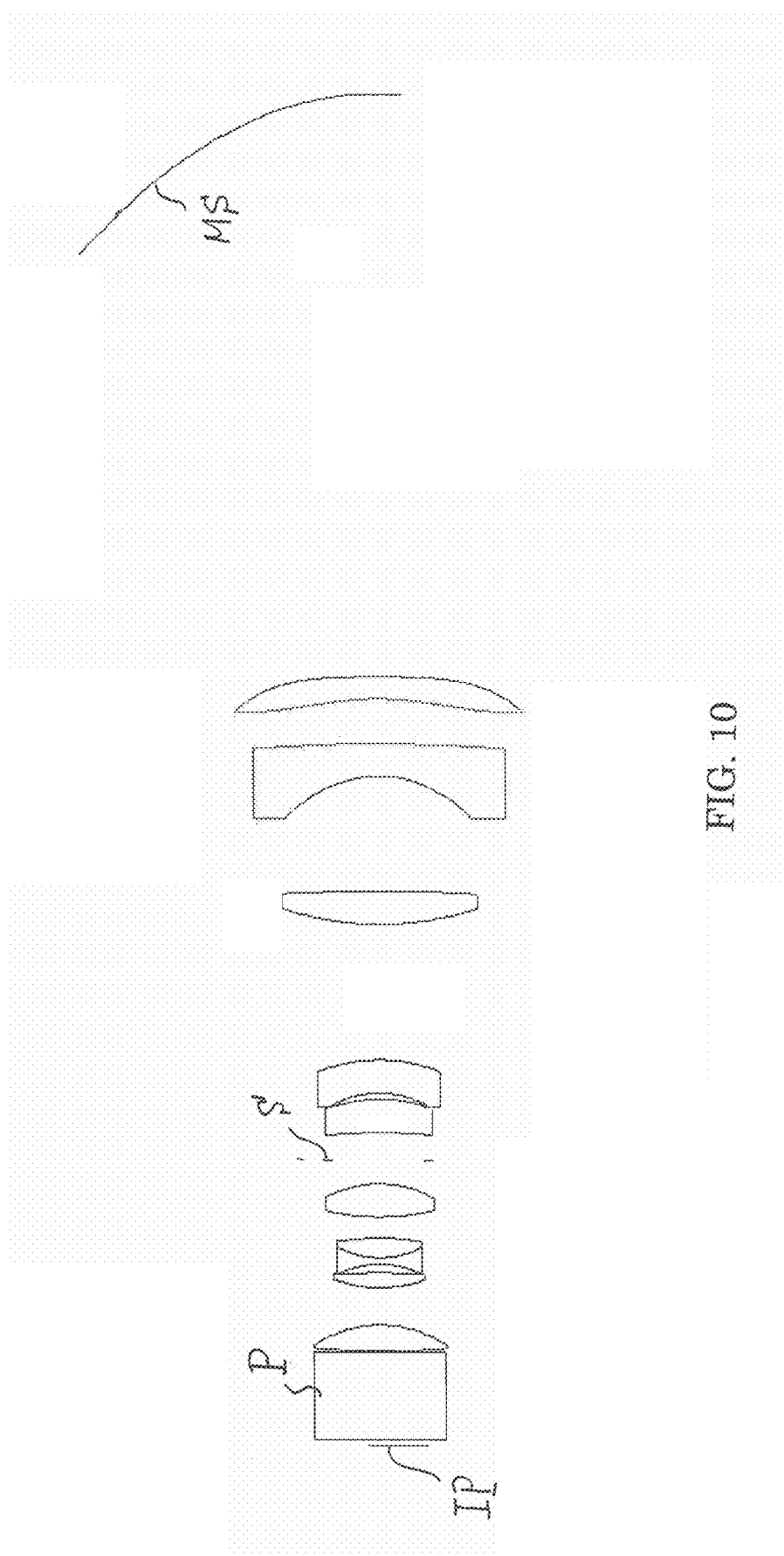
FIG. 10 shows a third example (Example 3) of a projection optical system in the embodiment in FIG. 9.

Data of the projection optical system of FIG. 10 are shown below as Example 3.

EXAMPLE 3

| i | R | D | j | N | ν |
|---|---|---|---|---|---|
| 0 | ∞ | 0.500 | | | |
| 1 | ∞ | 27.000 | | 1.51680 | 64.2 |
| 2 | ∞ | 0.300 | | | |
| 3 | 243.39589 | 7.876 | 1 | 1.61800 | 63.4 |
| 4 | −36.80043 | 11.415 | | | |
| 5 | 38.29383 | 4.437 | 2 | 1.48749 | 70.4 |
| 6 | −270.48389 | 2.620 | | | |
| 7 | −27.82599 | 2.000 | 3 | 1.75520 | 27.5 |
| 8 | 25.99933 | 5.787 | 4 | 1.49700 | 81.6 |
| 9 | −83.09026 | 6.394 | | | |
| 10 | 64.09770 | 10.000 | 5 | 1.59270 | 35.5 |
| 11 | −34.66611 | 7.002 | | | |
| 12 (Stop) | ∞ | 8.461 | | | |
| 13 | −144.0673 | 10.000 | 6 | 1.75136 | 30.4 |
| 14 | −47.22642 | 1.885 | | | |
| 15 | −29.11230 | 10.000 | 7 | 1.84666 | 23.8 |
| 16 | −51.94609 | 41.000 | | | |
| 17 | 97.21127 | 9.964 | 8 | 1.81305 | 40.6 |
| 18 | −502.02314 | 35.220 | | | |
| 19 | −37.09509 | 10.000 | 9 | 1.69895 | 30.1 |
| 20 | −476.03001 | Variable | | | |
| 21 (*) | −72.82677 | 6.600 | 10 | 1.53046 | 55.8 |
| 22 (*) | −237.58519 | Variable | | | |
| 23 (#) | −10000.000 | −530.000 | (Reflective surface) | | |
| IMG | ∞ | 0.000 | | | |

A 21st surface is axial-symmetric and aspheric, and has the following coefficients.
K=−16.266645
A=0.120791E−05, B=−0.218628E−09, C=0.199306E−13

A 22nd surface is axial-symmetric and aspheric and has the following coefficients.
K=−500.0
A =−0.219810E−05, B=−0.388265E−09, C=0.118932E−12

A 23rd surface is a free-form curved surface, and has the following coefficients.
K=−9.7635E+03, C4 =−5.9146E−03, C6=−5.7109E−03
C8=1.3364E−06, C10=−1.8655E−05, C11=2.1404E−10
C13=−2.0400E−07, C15=8.1614E−07, C17=−6.5598E−11
C19=1.0874E−08, C21=−2.0546E−08, C22=−9.8347E−13
C24=3.2450E−11, C26=−3.2424E−10, C28=3.0791E−10
C30=6.5044E−15, C32=−1.3436E−12, C34=6.5082E−12
C36=−2.6129E−12, C37=−2.0976E−16, C39=−3.7751E−15
C41=1.2508E−14, C43=−8.7230E−14, C45=9.2980E−15
C47=2.3106E−18, C49=1.1024E−16, C51=−3.4790E−18
C53=6.4308E−16, C55=1.1821E−17, C56=7.3701E−22
C58=−7.9731E−20, C60=8.3892E−19, C62=−3.1803E−19
C64=−1.9714E−18, C66=−1.3557E−19

If not particularly specified in the foregoing, the coefficient of the aspheric surface and the free-form curved surface is "0". This holds true to an Example 4 to be described later.

Variables:

| | Sizes of image projecting screens | |
|---|---|---|
| | 78 inches | 64 inches |
| D S2 | 0.300 | 0.333 |
| D S20 | 13.527 | 13.885 |
| D S22 | 176.414 | 176.022 |
| D S23 | −530.000 | −448.461 |

NA at the image panel: 0.29.
OAL=408.4
Object sizes: y (perpendicular size)=2.2~14
x (horizontal size)=−8~8
Parameter for Condition (1): 25.3
Parameter for Condition (2): 1.62032
Parameters for Condition (3): 1.8550 (Ne of 7th lens) 1.7044 (Ne of 9th lens)

Figure 11:
FIG. 11 is a spot diagram of an image projected on the 78-inch projection screen in Example 3.

FIG. 11 is a spot diagram of images displayed on the projection screen PS in Example 3.

In the spot diagram of FIG. 11, images, on a liquid crystal image panel whose aspect ratio is 4:3 and whose diagonal length is 0.78 inches, are enlarged and projected onto a projection screen having the diagonal length of 78 inches.

Figure 12:
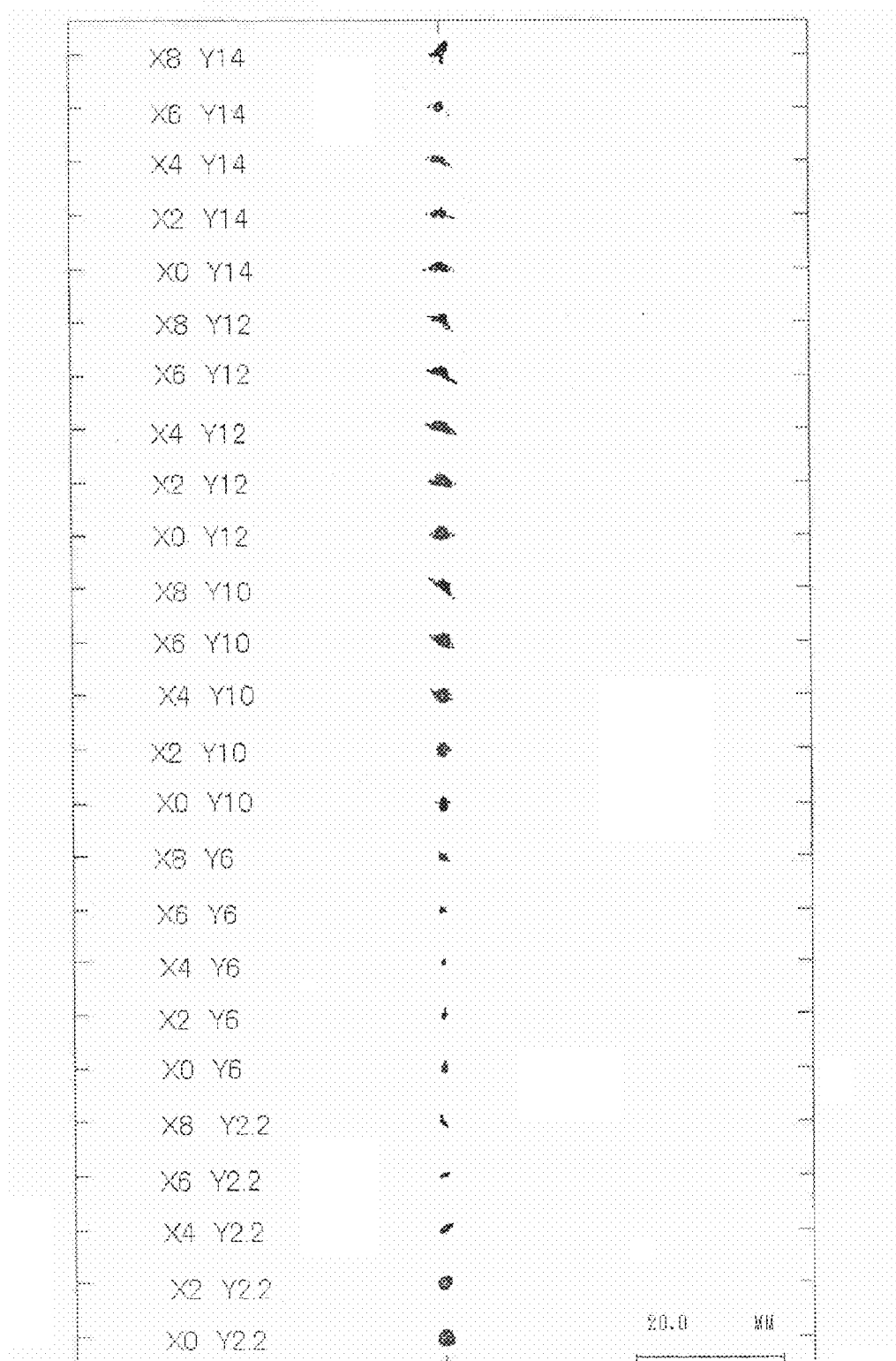
FIG. 12 is a spot diagram of an image projected on the 64-inch projection screen in Example 3.

FIG. 12 is a spot diagram of images displayed on the projection screen PS in Example 3.

In the spot diagram of FIG. 12, images, on the liquid crystal image panel whose aspect ratio is 4:3 and whose diagonal length is 0.78 inches, are enlarged and projected onto a projection screen having the diagonal length of 64 inches.

Figure 13:
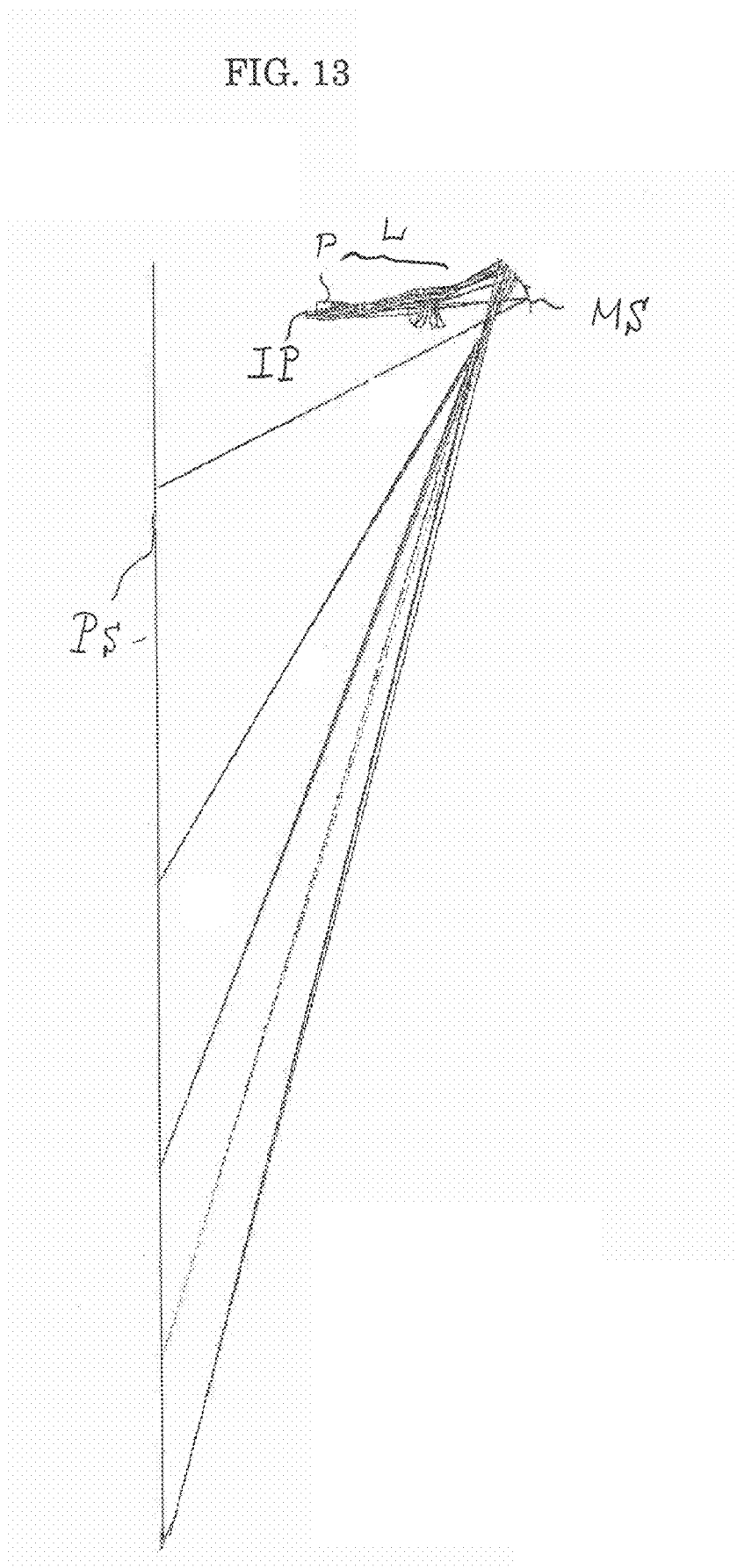
FIG. 13 shows a projector according to a final embodiment of the invention.

FIG. 13 shows a projector according to a still further embodiment. For convenience sake, like or corresponding reference symbols and reference numbers are used as those shown in FIG. 1.

In the embodiment in FIG. 13, lenses of the lens system L at an object side of the stop S share one optical axis while lenses at an image side of the stop S share another optical axis. However, the optical axes at the opposite sides of the stop disagree with each other. Further, an optical axis of the reflecting surface is displaced from the optical axis shared by the lenses at the object side of the stop S. The optical axis at the object side of the stop S is shared by the most lenses.

The image displaying surface IP is displaced downward as shown in FIG. 13 with respect to the optical axis shared by the lenses at the object side of the stop S. Therefore, there is the distance Y between the optical axis shared by the lenses at the object side of the stop S and the lower edge of the image displaying surface IP as shown in FIG. 13.

Since the image displaying surface IP is displaced with respect to the optical axis shared by the lenses at the object side of the stop S, the projection optical system functions as an off-axis optical system which forms images using oblique light rays. The image on the image displaying surface IP is enlarged and projected onto the projection screen PS by the image forming functions of the lens system L and the reflecting surface MS of the curved mirror. Refer to FIG. 13.

Figure 14:
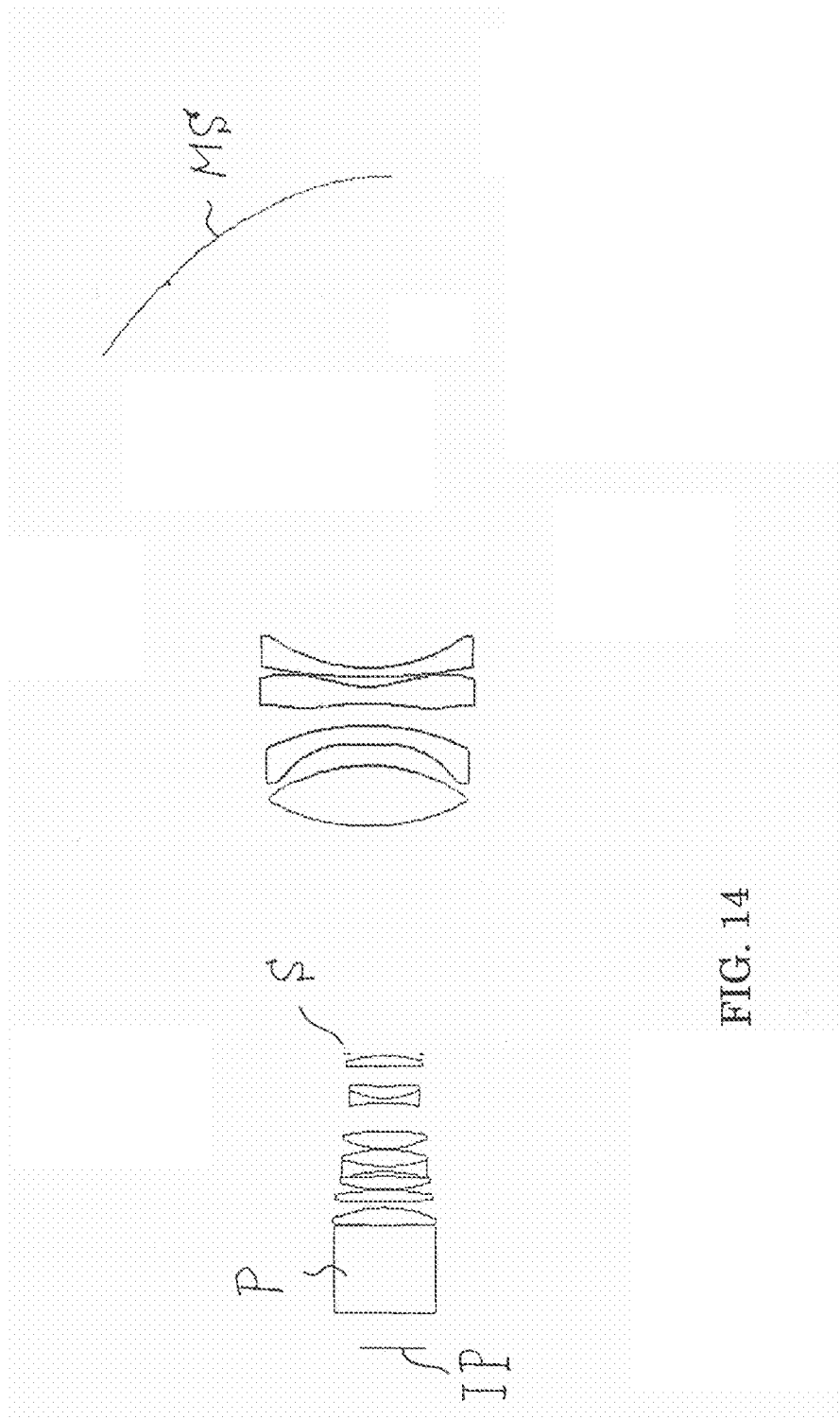
FIG. 14 shows a fourth example (Example 4) of a projection optical system in the embodiment in FIG. 13.

FIG. 14 shows a specific configuration of the projecting optical system according to the embodiment of FIG. 13.

In FIG. 14, data of the projection optical system are shown as Example 4.

EXAMPLE 4

| i | R | D | j | N | ν |
|---|---|---|---|---|---|
| 0 | ∞ | 10.400 | | | |
| 1 | ∞ | 27.500 | | 1.51680 | 64.2 |
| 2 | ∞ | 0.000 | | | |
| 3 | 221.99060 | 5.263 | 1 | 1.51823 | 59.0 |
| 4 | −43.32818 | 2.131 | | | |
| 5 | 427.39205 | 3.276 | 2 | 1.51823 | 59.0 |
| 6 | −91.87051 | 0.300 | | | |
| 7 | 48.81452 | 4.105 | 3 | 1.48749 | 70.4 |
| 8 | −208.55401 | 1.560 | | | |
| 9 | −44.36637 | 1.600 | 4 | 1.83400 | 37.3 |
| 10 | 43.27898 | 5.051 | 5 | 1.49700 | 81.6 |
| 11 | −49.78687 | 0.300 | | | |
| 12 | 29.00567 | 5.480 | 6 | 1.48749 | 70.4 |
| 13 | −74.96679 | 8.863 | | | |
| 14 | −58.28332 | 1.400 | 7 | 1.83400 | 37.3 |
| 15 | 23.44971 | 3.790 | 8 | 1.48749 | 70.4 |
| 16 | 153.56154 | 6.358 | | | |
| 17 | −331.82123 | 3.304 | 9 | 1.84666 | 23.8 |
| 18 | −40.46769 | 0.371 | | | |
| 19 (Stop) | ∞ | Variable | | | |
| 20 | 63.89415 | 19.060 | 10 | 1.51680 | 64.2 |
| ΔY = 5.000 | | | | | |
| 21 | −53.28671 | Variable | | | |
| 22 (*) | −312.79326 | 5.500 | 11 | 1.53046 | 55.8 |
| 23 (*) | −98.78860 | 7.165 | | | |
| 24 (*) | −59.26451 | 5.000 | 12 | 1.53046 | 55.8 |
| 25 (*) | 26.71955 | Variable | | | |
| 26 | 169.96226 | 3.000 | 13 | 1.83400 | 37.3 |
| 27 | 52.43843 | Variable | | | |
| 28 (*) | −69.59940 | Variable | (Reflecting surface) | | |
| ΔY = −5.000 | | | | | |
| IMG | ∞ | 0.000 | | | |

A 22nd surface is axial-symmetric and aspheric, and has the following coefficients.
K=0.000000
A =−0.258176E−04, B=0.862854E−08, C=0.593441E−11, D=−0.327956E−14

A 23rd surface is axial-symmetrical and aspheric, and has the following coefficients.
K=0.000000
A =−0.525113E−05, B=0.674453E−08, C=−0.450325E−11, D=0.130656E−14

A 24th surface is axial-symmetrical and aspheric, and has the following coefficients.
K=−4.027985
A=0.115837E−04, B=−0.915031E−09, C=−0.826204E−11, D=0.449270E−14 E=0.129610E−17, F=−0.198992E−20, G=0.310917E−24

A 25th surface is axial-symmetrical and aspheric, and has the following coefficients.
K=−6.045148
A =−0.126937E−04, B=0.107777E−07, C=−0.459001E−11, D=−0.108169E−14 E=0.630308E−18, F=0.683893E−21, G=−0.451-435E−24

A 28th surface is axial-symmetrical and aspheric, and has the following coefficients.
K=−2.751902
A =−0.552112E−06, B=0.704592E−10, C=−0.740927E−14, D=0.173827E−18 E=0.399460E−22, F=−0.390960E−26, G=0.981348E−31

ΔY denotes a shift amount of the center of the surface in the Y direction (vertically).

A surface, which is positioned near the screen side compared to the surface which is shifted by ΔY in the foregoing data, is also shifted by the same amount.

Variables:

| | Sizes of projection screens | | |
|---|---|---|---|
| | 100 inches | 70 inches | 50 inches |
| D S19 | 71.548 | 70.481 | 69.002 |
| D S21 | 6.640 | 6.604 | 6.534 |
| D S25 | 3.086 | 3.468 | 4.092 |
| D S27 | 154.000 | 154.718 | 155.646 |
| D S28 | −623.000 | −449.269 | −333.195 |

NA at the image panel: 0.27
OAL=366.05
Object sizes: y (vertically)=1.9~11.5
  x (horizontally)=−6.4~6.4
Parameter for Condition (1): 27.81
Parameter for Condition (2): 1.52033
Parameter for Condition (3): 1.83930 (Ne of 13th lens)

Figure 15:
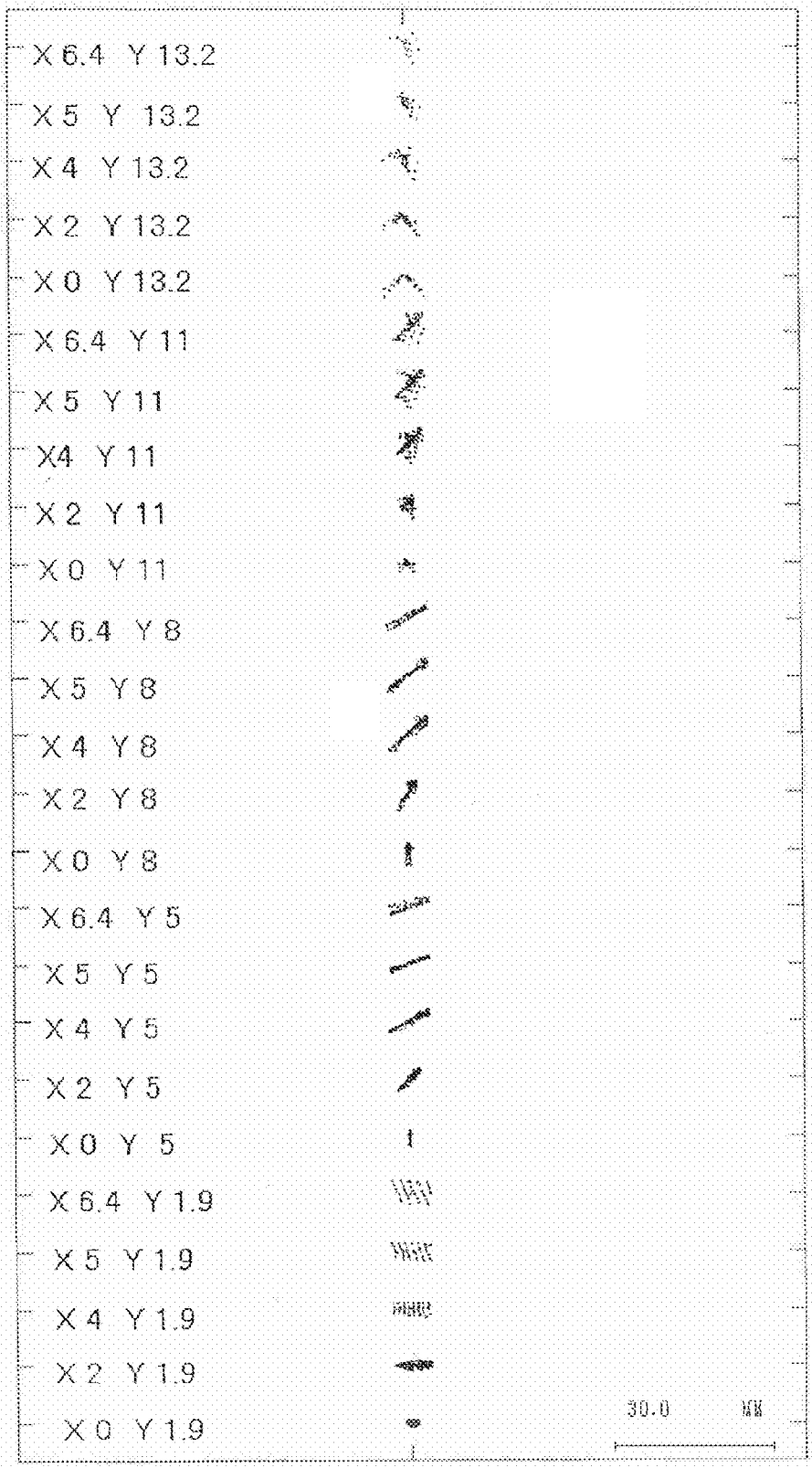
FIG. 15 is a spot diagram of a image projected on a 100-inch projection screen in Example 4.

FIG. 15 is a spot diagram of images displayed on a projection screen PS in Example 4.

In the spot diagram of FIG. 15, images on the liquid crystal panel which has an aspect ratio of 4:3 and a diagonal length of 0.78 inches are enlarged and projected onto a projection screen having the diagonal length of 100 inches.

Figure 16:
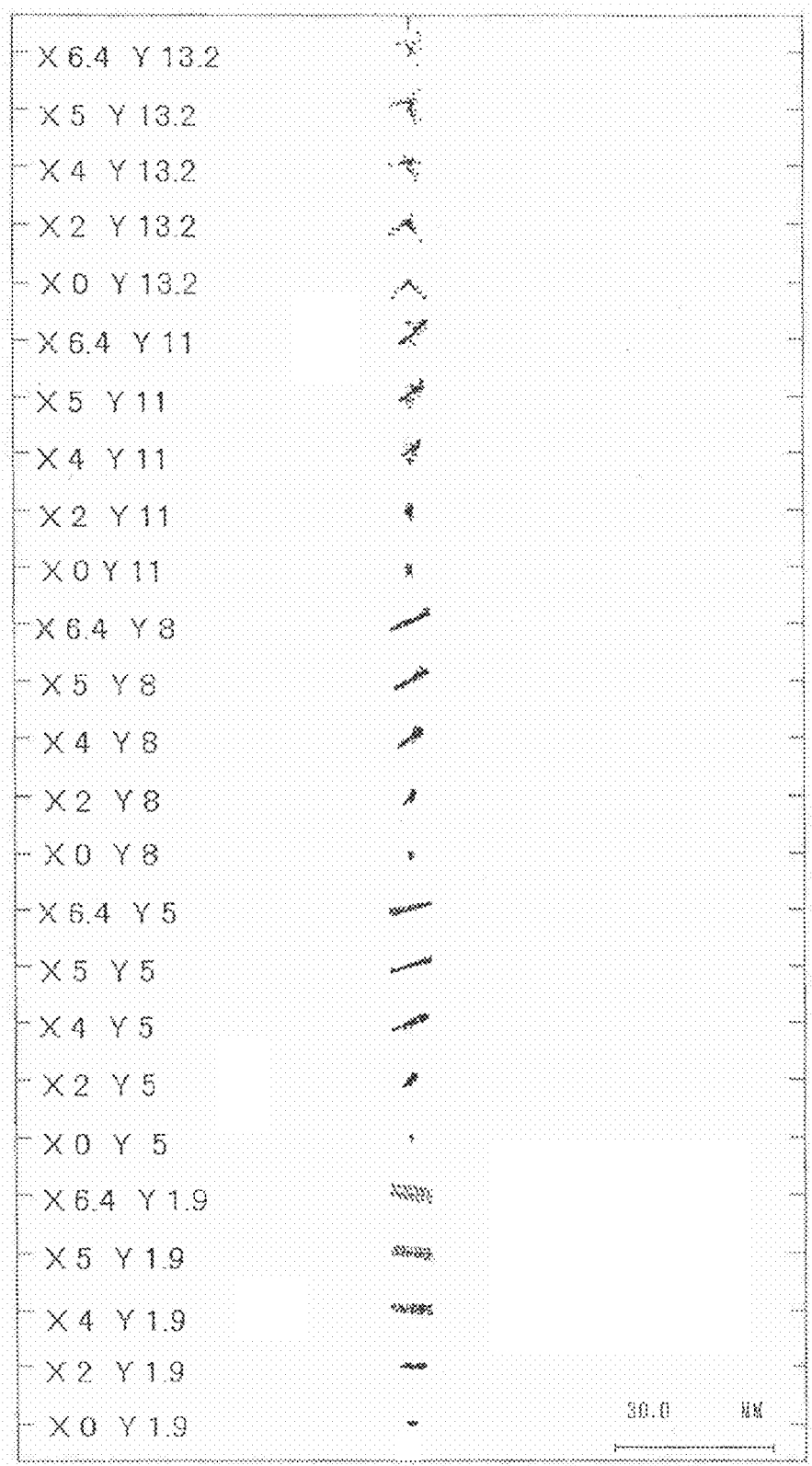
FIG. 16 is a spot diagram of an image projected on a 70-inch projection screen in Example 4.

FIG. 16 is a spot diagram of images displayed on the projection screen PS in Example 4.

Figure 17:
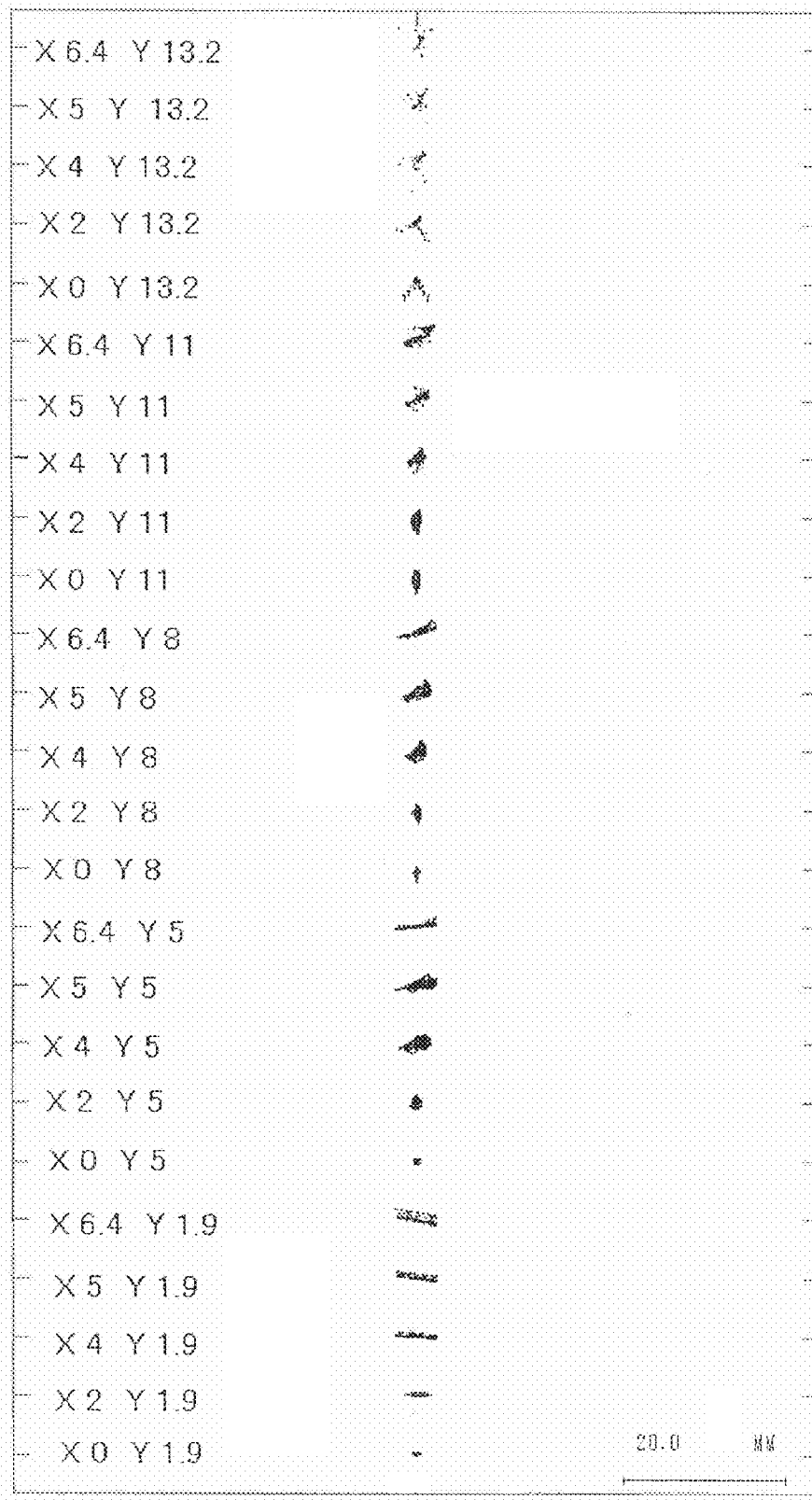
FIG. 17 is a spot diagram of an image projected on a 50-inch projection screen in Example 4.

In the spot diagram of FIG. 17, images on the liquid crystal panel which has an aspect ratio of 4:3 and a diagonal length of 0.78 inches are enlarged and projected onto a projection screen having the diagonal length of 70 inches.

FIG. 17 is a spot diagram of images displayed on the projection screen PS in Example 4

In the spot diagram of FIG. 16, images on the liquid crystal panel which has an aspect ratio of 4:3 and a diagonal length of 0.78 inches are enlarged and projected onto a projection screen having the diagonal length of 50 inches. Specifically, although the projection optical systems in Example 1 to Example 4 have short optical lengths, they can project large images which are relatively free from distortions and have high resolving power. The projection optical system can freely change sizes of projected images.

In Example 1 to Example 4, the projection optical systems enlarge the image on the image displaying surface IP and project the enlarged image onto the projection surface PS. Each of the projection optical system includes the lens system L having a plurality of lenses, and one or more curved mirrors. Image forming light flux shooting out via the lens system L is first incident on the concave surfaces MS of the curved mirrors.

OAL is the distance between the image displaying surface IP and the curved mirror surface nearest the projection surface along the optical axis shared by the largest number of the lenses of the lens system L. Y is the distance on the displaying surface between the edge of the image displaying surface and the optical axis shared by the largest number of lenses. OAL and Y satisfy the following requirement.

$$20 < OAL/Y < 30 \qquad (1)$$

With the foregoing projection optical systems, it is possible to vary sizes of images projected on the projection surface PS, by holding a constant distance between the image displaying surface IP and the mirror surface MS of the curved mirror which is farthest from the image displaying surface IP to be constant. and by changing the position of a part of optical elements which are present between the image displaying surface IP and the mirror surface MS depending upon a distance between the mirror surface MS and the projection surface PS.

Further, in the projection optical systems in Examples 1 to 3, all the lenses of the lens system L share the same optical axes, and the aperture number of the image displaying surface side is equal to or larger than 0.25.

With each of the projection optical systems in Examples 1 to 4, a negative lens (j=3, or j=4 in Example 4), which is nearest the image displaying surface among negative lenses of the lens system L, has one surface facing with the image displaying surface and being in contact with the air, and being concave. Further, each projection optical system includes the stop S between the lens nearest the image displaying surface and the lens nearest the projection surface.

In the lens system L, a positive lens (j=1) "nearest the image displaying surface" has the refraction factor nPe with respect to the line e of the lens material, which satisfies the requirement (2). The surface MS of the curved mirror nearest the projection surface on the image forming path is a surface which is axisymmetrical to the optical axis shared by the most lenses in the system.

Each of the projection optical systems in Examples 1 to 4 includes the stop S between the lens nearest the image displaying surface and the lens nearest the projection surface. Each of negative spherical lenses which are present between the stop S and the curved mirror has the refraction factor nNe with respect to the line e of the lens material, which satisfies the requirement (3). Each optical projection system includes one curved mirror.

In the optical arrangement shown in FIG. 1, FIG. 5, FIG. 9 and FIG. 13, the present invention can accomplish an image reading device including a projection optical system under the following conditions: a manuscript is placed on the projection screen PS; an acceptance surface for imaging elements are placed on the image panel or on a position which is optically equivalent to the image displaying surface; and the optical projection system is used as a reducing optical system.

Industrial Applicability

Although having a rather short whole length, the projection optical system according to the present invention can project large and high quality images onto the projection screen, and is usable as a projector and an image reading device.

The invention claimed is:

1. A projection optical system enlarging images on an image displaying surface, and projecting enlarged images onto a projection surface, the optical system comprising:
a lens system including a plurality of lenses and a curved mirror, wherein
light flux of enlarged image shooting out from the lens system to the projection screen is incident onto a concave surface of the curved mirror first of all; and
a distance OAL and a distance Y satisfy a requirement $$20 < OAL/Y < 28, \qquad (1)$$

the distance OAL being present between the image displaying surface and a surface of the curved mirror nearest the projection surface and along an optical path shared by most lenses of the lens system, and on the image displaying surface, the distance Y being present between the optical axis shared by the most lenses and an edge of the image displaying surface which is farthest from the optical axis shared by the most lenses, wherein a numerical aperture at the image displaying surface side is equal to or larger than 0.25.

2. The projection optical system according to claim 1, wherein sizes of the images projected onto the projection surface are variable;

a distance between the image displaying surface and a surface of the curved mirror farthest from the image displaying surface on the image forming path is maintained constant when varying sizes of the images; and a part or all of optical elements which are present between the image displaying surface and the surface of the curved mirror are relocated depending upon a distance between the surface of the curved mirror and the projection screen.

3. The projection optical system according to claim 1, wherein the lenses constituting the lens system share one optical axis.

4. The projection optical system according to claim 1, wherein a negative lens which is nearest the image displaying surface in the lens system is in contact with the air and has a concave surface facing with the image displaying surface.

5. The projection optical system according to claim 1, wherein a stop is provided between the lens nearest the image displaying surface and the lens nearest the projection surface.

6. The projection optical system according to claim 1, wherein a refraction index nPe with respect to a line e of a lens material of a positive lens nearest the image displaying surface in the lens system satisfies a requirement $$of\ 1.45 < nPe < 1.65. \tag{2}$$

7. The projection optical system according to claim 1, wherein the curved mirror nearest the projection surface on the optical path has a surface which is axisymmetrical to the optical axis shared by the most lenses in the lens system.

8. The projection optical system according to claim 1, wherein
- a stop is provided between the lens nearest the image displaying surface and the lens nearest the projection surface, and
- a refraction index nNe with respect to a line e of the lens material of negative spherical lenses positioned between the stop and the curved mirror in the lens system satisfies a requirement $$of\ 2.0 > nNe > 1.65. \tag{3}$$

9. A projector including a projection optical system defined in claim 1.

10. An image reading device in which the projection optical system defined in claim 1 is used as a reducing optical system, and which takes in images using light receiving surfaces of image pickup elements at the position of the image lens material.

11. The projection optical system according to claim 1, wherein the distance OAL and the distance Y satisfy 20<OAL/Y <27.81.

12. A projection optical system enlarging images on an image displaying surface, and projecting enlarged images onto a projection surface, the optical system comprising:
- a lens system including a plurality of lenses and a curved mirror, wherein
- light flux of enlarged image shooting out from the lens system to the projection screen is incident onto a concave surface of the curved mirror first of all; and
- a distance OAL and a distance Y satisfy a requirement $$20 < OAL/Y < 28, \tag{1}$$

the distance OAL being present between the image displaying surface and a surface of the curved mirror nearest the projection surface and along an optical path shared by most lenses of the lens system, and on the image displaying surface, the distance Y being present between the optical axis shared by the most lenses and an edge of the image displaying surface which is farthest from the optical axis shared by the most lenses, wherein
- a stop is provided between the lens nearest the image displaying surface and the lens nearest the projection surface.

13. The projection optical system according to claim 12, wherein
- a refraction index nNe with respect to a line e of the lens material of negative spherical lenses positioned between the stop and the curved mirror in the lens system satisfies a requirement $$of\ 2.0 > nNe > 1.65. \tag{3}$$

14. The projection optical system according to claim 12, wherein
- sizes of the images projected onto the projection surface are variable;
- a distance between the image displaying surface and a surface of the curved mirror farthest from the image displaying surface on the image forming path is maintained constant when varying sizes of the images; and
- a part or all of optical elements which are present between the image displaying surface and the surface of the curved mirror are relocated depending upon a distance between the surface of the curved mirror and the projection screen.

15. The projection optical system according to claim 12, wherein the lenses constituting the lens system share one optical axis.

16. The projection optical system according to claim 12, wherein a negative lens which is nearest the image displaying surface in the lens system is in contact with the air and has a concave surface facing with the image displaying surface.

17. The projection optical system according to claim 12, wherein a refraction index nPe with respect to a line e of a lens material of a positive lens nearest the image displaying surface in the lens system satisfies a requirement $$of\ 1.45 < nPe < 1.65. \tag{2}$$

18. The projection optical system according to claim 12, wherein the curved mirror nearest the projection surface on the optical path has a surface which is axisymmetrical to the optical axis shared by the most lenses in the lens system.

19. A projector including a projection optical system defined in claim 12.

20. An image reading device in which the projection optical system defined in claim 12 is used as a reducing optical system, and which takes in images using light receiving surfaces of image pickup elements at the position of the image lens material.

21. The projection optical system according to claim 12, wherein the distance OAL and the distance Y satisfy 20<OAL/Y <27.81.

* * * * *

UNITED STATES PATENT AND TRADEMARK OFFICE
CERTIFICATE OF CORRECTION

| | |
|---|---|
| PATENT NO. | : 8,419,191 B2 |
| APPLICATION NO. | : 12/529920 |
| DATED | : April 16, 2013 |
| INVENTOR(S) | : Osamu Nagase et al. |

It is certified that error appears in the above-identified patent and that said Letters Patent is hereby corrected as shown below:

On the title page, Item (86), the PCT information is incorrect. Item (86) should read:

--(86) PCT No.:  PCT/JP2008/054431

§ 371 (c)(1),
(2), (4) Date:  Nov. 16, 2009--

Signed and Sealed this
Sixteenth Day of July, 2013

Teresa Stanek Rea
*Acting Director of the United States Patent and Trademark Office*